United States Patent
Watanabe et al.

(10) Patent No.: US 12,377,713 B2
(45) Date of Patent: Aug. 5, 2025

(54) ELECTRIC COMPRESSOR CONTROL DEVICE, ELECTRIC COMPRESSOR, AND ELECTRIC COMPRESSOR CONTROL METHOD

(71) Applicant: MITSUBISHI HEAVY INDUSTRIES THERMAL SYSTEMS, LTD., Tokyo (JP)

(72) Inventors: Kyohei Watanabe, Tokyo (JP); Akinori Yoshioka, Tokyo (JP); Makoto Takeuchi, Tokyo (JP); Tomoki Hase, Tokyo (JP); Takashi Mitsumata, Tokyo (JP); Shinya Hamamoto, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 114 days.

(21) Appl. No.: 18/283,680

(22) PCT Filed: May 12, 2022

(86) PCT No.: PCT/JP2022/020074
§ 371 (c)(1),
(2) Date: Sep. 22, 2023

(87) PCT Pub. No.: WO2022/239836
PCT Pub. Date: Nov. 17, 2022

(65) Prior Publication Data
US 2024/0166024 A1 May 23, 2024

(30) Foreign Application Priority Data
May 12, 2021 (JP) .................. 2021-080872

(51) Int. Cl.
*B60H 1/32* (2006.01)
*H02P 29/024* (2016.01)

(52) U.S. Cl.
CPC ......... *B60H 1/3205* (2013.01); *H02P 29/026* (2013.01); *B60H 2001/3238* (2013.01); *B60H 2001/3292* (2013.01)

(58) Field of Classification Search
CPC .......... B60H 1/3205; B60H 2001/3238; B60H 2001/3292; H02P 29/026
See application file for complete search history.

(56) References Cited

U.S. PATENT DOCUMENTS 6,381,545 B1 * 4/2002 Goubeaux ............ B60H 1/3225
62/126
7,392,158 B2 8/2008 Hikawa et al.
(Continued)

FOREIGN PATENT DOCUMENTS

| JP | 2004-60457 A | 2/2004 |
| JP | 2008-137533 A | 6/2008 |

(Continued)

OTHER PUBLICATIONS

International Search Report dated Jul. 19, 2022 for Application No. PCT/JP2022/020074 with an English translation.
(Continued)

*Primary Examiner* — Zoheb S Imtiaz
(74) *Attorney, Agent, or Firm* — Birch, Stewart, Kolasch & Birch, LLP

(57) ABSTRACT

This electric compressor control device comprises: a control unit of an inverter which controls a motor that drives a compressor; a physical quantity calculation unit which calculates, on the basis of one or a plurality of predetermined detection values acquired from the inverter, a physical quantity that varies depending on a workload of the compressor; a number-of-revolutions acquisition unit which acquires the number of revolutions of the motor; a storage unit which stores information representing a first threshold that varies depending on the number of revolutions of the
(Continued)

motor, and defines whether or not the physical quantity is a normal value; and a refrigerant abnormality determination unit which determines whether or not there is an abnormality in a refrigerant system by comparing the calculated physical quantity with the first threshold, depending on the acquired number of revolutions.

9 Claims, 10 Drawing Sheets

(56) References Cited

U.S. PATENT DOCUMENTS

| 2012/0234030 | A1 | 9/2012 | Hagita et al. | |
|---|---|---|---|---|
| 2017/0331400 | A1 | 11/2017 | Saha et al. | |
| 2019/0047372 | A1* | 2/2019 | Schroeder | G01K 7/427 |
| 2019/0052214 | A1 | 2/2019 | Sumita et al. | |
| 2021/0108836 | A1 | 4/2021 | Furugaki et al. | |
| 2023/0016257 | A1* | 1/2023 | Richardson | B60H 1/3227 |
| 2024/0088818 | A1 | 3/2024 | Hattori et al. | |

FOREIGN PATENT DOCUMENTS

| JP | 2010-51040 A | 3/2010 |
|---|---|---|
| JP | 2017-187226 A | 10/2017 |
| JP | 6418252 B2 | 11/2018 |
| JP | 2021-69207 A | 4/2021 |
| WO | WO 2011/099190 A1 | 8/2011 |
| WO | WO 2017/138167 A1 | 8/2017 |
| WO | WO 2019/116471 A1 | 6/2019 |
| WO | WO 2019/176004 A1 | 9/2019 |

OTHER PUBLICATIONS

Written Opinion of the International Searching Authority dated Jul. 19, 2022 for Application No. PCT/JP2022/020074 with an English translation.

* cited by examiner

ELECTRIC COMPRESSOR CONTROL DEVICE, ELECTRIC COMPRESSOR, AND ELECTRIC COMPRESSOR CONTROL METHOD

TECHNICAL FIELD

The present disclosure relates to an electric compressor control device, an electric compressor, and an electric compressor control method. Priority is claimed on Japanese Patent Application No. 2021-080872, filed on May 12, 2021, the content of which is incorporated herein by reference.

BACKGROUND ART

PTL 1 discloses a device that detects an instantaneous current and an instantaneous voltage applied to a three-phase coil of a motor and estimates a motor drive torque or the like from detection values thereof. In addition, in the device described in PTL 1, for example, a condensation pressure, an evaporation pressure, a suction heating degree, poor lubrication, liquid compression, and the like are estimated based on the motor drive torque estimated from the detection values of the instantaneous current and the instantaneous voltage and a detection value of a temperature of an outdoor heat exchanger or a temperature of an indoor heat exchanger in a refrigerant system.

CITATION LIST

Patent Literature

[PTL 1] Japanese Unexamined Patent Application Publication No. 2004-60457

SUMMARY OF INVENTION

Technical Problem

However, since the device described in PTL 1 estimates a state of the refrigerant system using the detection value of the temperature in the refrigerant system as described above, there is a problem in that a configuration for an estimation process may be complicated.

The present disclosure has been made to solve the above problem, and an object of the present disclosure is to provide an electric compressor control device, an electric compressor, and an electric compressor control method capable of simplifying a configuration.

Solution to Problem

In order to solve the above problem, an electric compressor control device according to the present disclosure includes: a control unit of an inverter that controls a motor that drives a compressor; a physical quantity calculation unit that calculates a physical quantity that changes according to a workload of the compressor based on one or a plurality of predetermined detection values obtained from the inverter; a rotation speed acquisition unit that acquires a rotation speed of the motor; a storage unit that stores information representing a first threshold value that changes according to the rotation speed of the motor and defines whether or not the physical quantity is a normal value; and a refrigerant abnormality determination unit that determines whether or not there is an abnormality in a refrigerant system by comparing the calculated physical quantity with the first threshold value according to the acquired rotation speed.

An electric compressor according to the present disclosure includes: a compressor; a motor that drives the compressor; a control unit of an inverter that controls the motor; a physical quantity calculation unit that calculates a physical quantity that changes according to a workload of the compressor based on one or a plurality of predetermined detection values obtained from the inverter; a rotation speed acquisition unit that acquires a rotation speed of the motor; a storage unit that stores information representing a first threshold value that changes according to the rotation speed of the motor and defines whether or not the physical quantity is a normal value; and a refrigerant abnormality determination unit that determines whether or not there is an abnormality in a refrigerant system by comparing the calculated physical quantity with the first threshold value according to the acquired rotation speed.

An electric compressor control method according to the present disclosure is a control method of an inverter that controls a motor that drives a compressor, and includes: a step of calculating a physical quantity that changes according to a workload of the compressor based on one or a plurality of predetermined detection values obtained from the inverter; a step of acquiring a rotation speed of the motor; and a step of determining whether or not there is an abnormality in a refrigerant system by comparing the calculated physical quantity with a first threshold value that changes according to the rotation speed of the motor and defines whether or not the physical quantity is a normal value according to the acquired rotation speed.

Advantageous Effects of Invention

According to the electric compressor control device, the electric compressor, and the electric compressor control method of the present disclosure, the configuration can be simplified.

DESCRIPTION OF EMBODIMENTS

First Embodiment

Hereinafter, an electric compressor control device, an electric compressor, and an electric compressor control method according to an embodiment of the present disclosure will be described with reference to FIGS. 1 to 6. In the respective drawings, identical or corresponding configurations are denoted by the same reference signs and the description thereof will not be repeated as appropriate. Further, in this specification and drawings, the electric compressor is abbreviated as an electric compressor.

Figure 1:
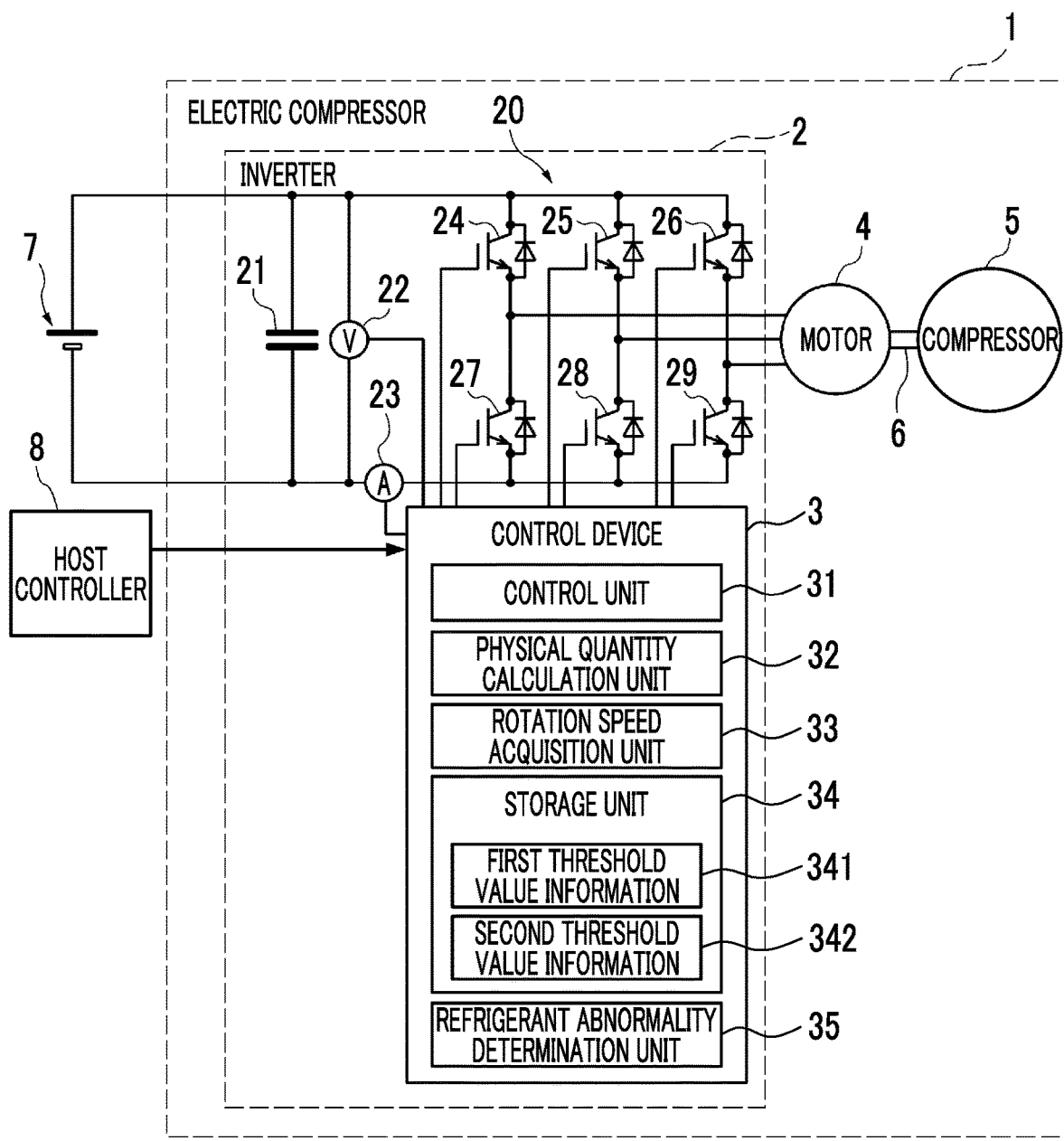
FIG. 1 is a block diagram showing a configuration example of an electric compressor according to an embodiment of the present disclosure.
Figure 2:
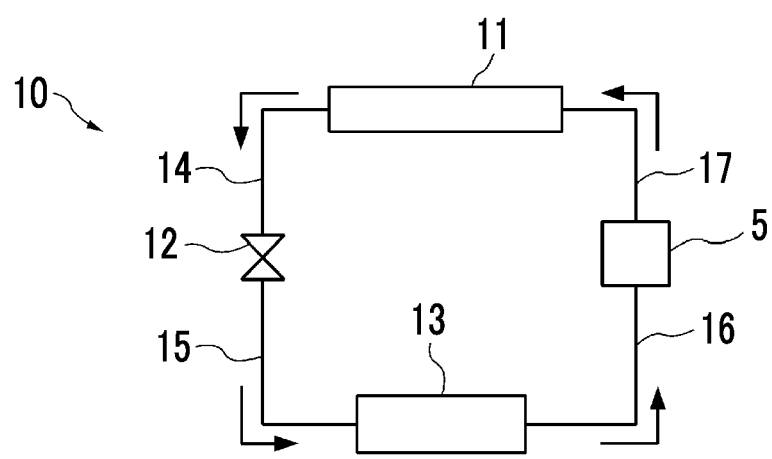
FIG. 2 is a system diagram showing a configuration example of a refrigerant system of a compressor 5 shown in FIG. 1.
Figure 3:
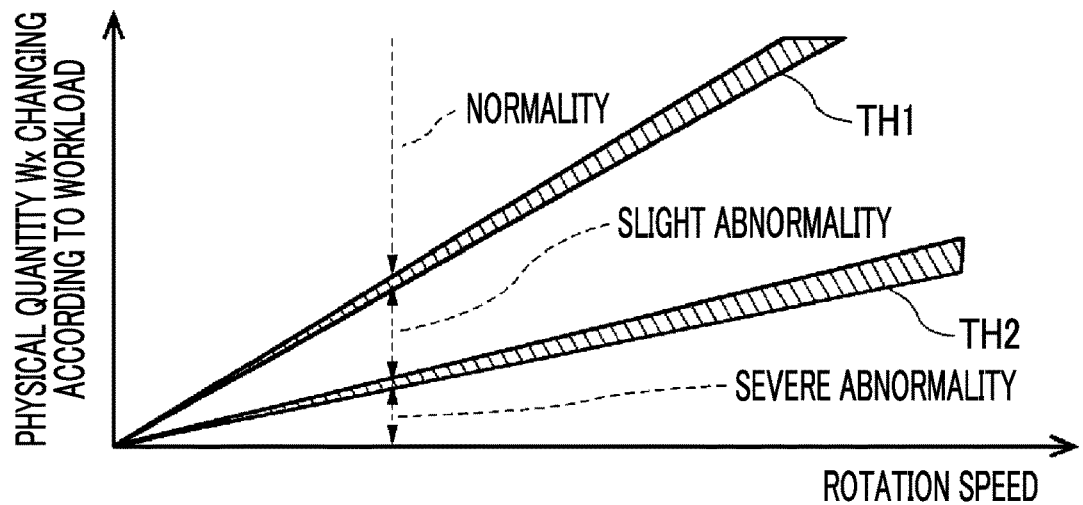
FIG. 3 is a schematic diagram for describing an operation example of an electric compressor 1 shown in FIG. 1.
Figure 4:
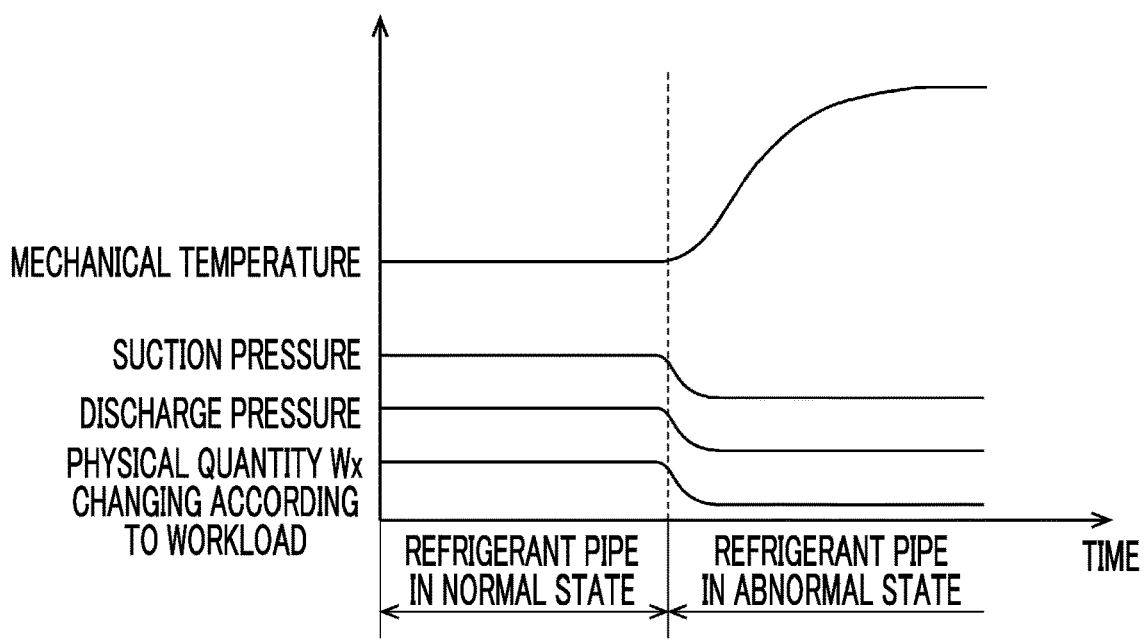
FIG. 4 is a schematic diagram for describing an operation example of the electric compressor 1 shown in FIG. 1.
Figure 5:
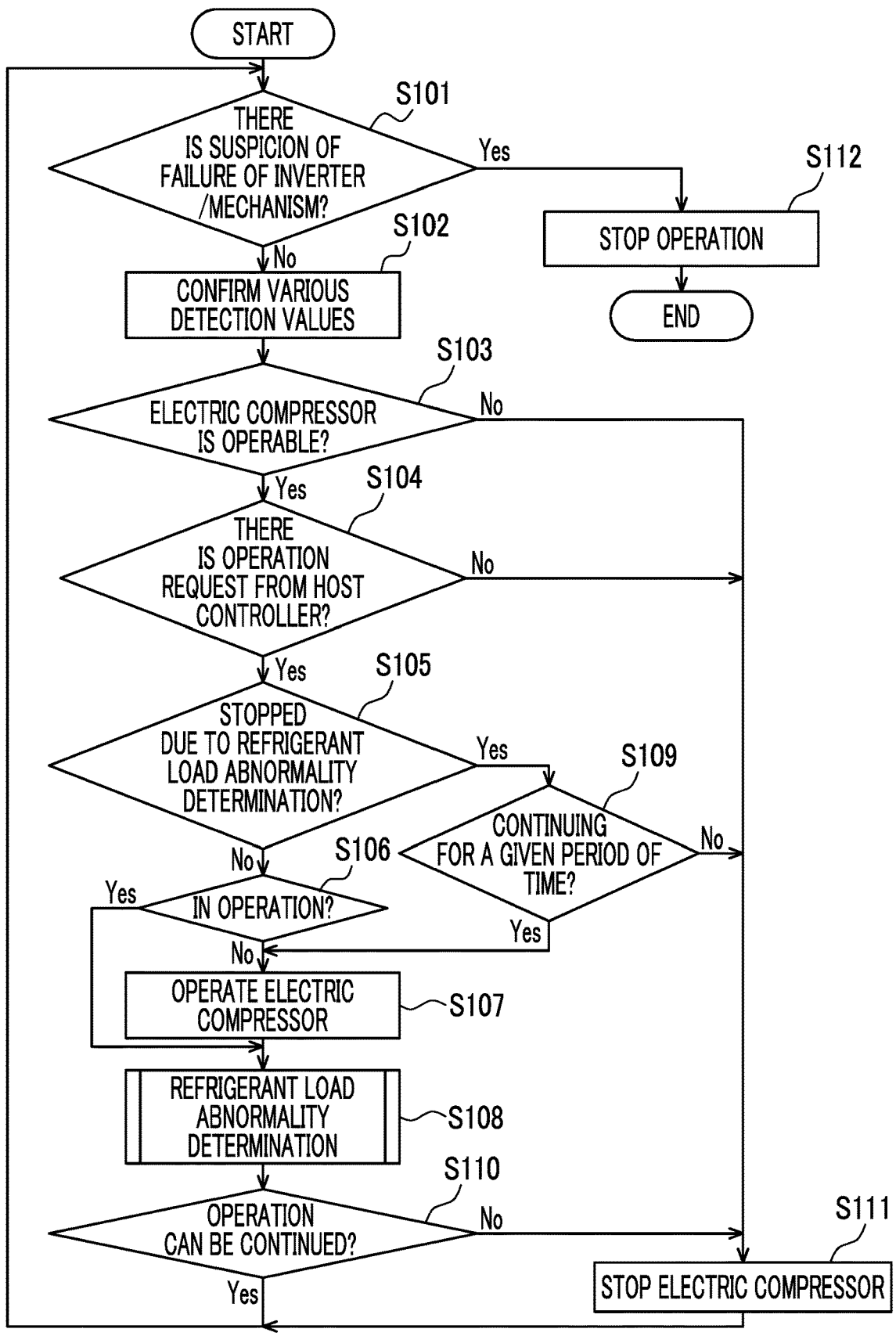
FIG. 5 is a flowchart showing an operation example of a control device 3 shown in FIG. 1.
Figure 6:
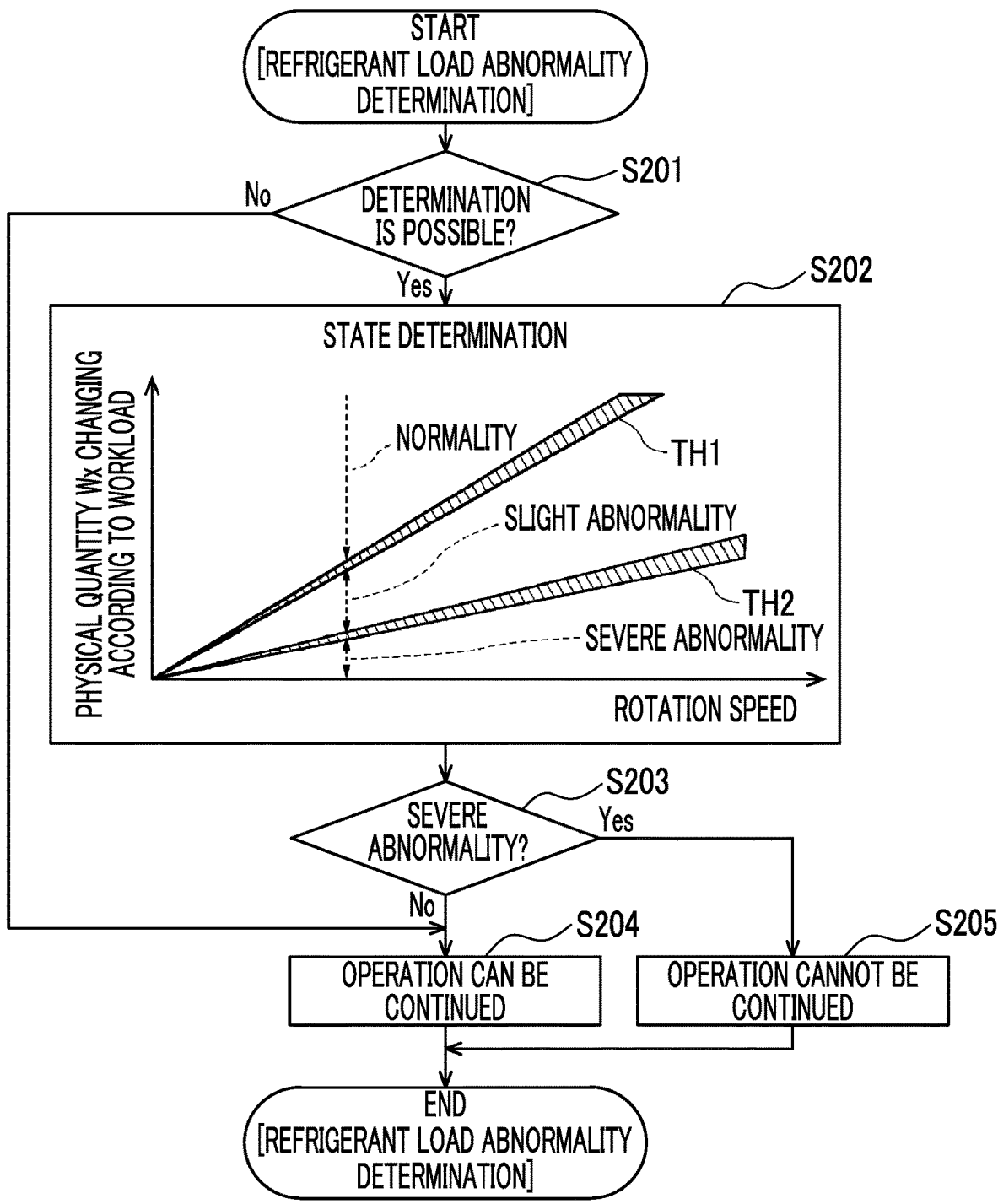
FIG. 6 is a flowchart showing an example (first embodiment) of contents of refrigerant load abnormality determination (S108) shown in FIG. 5.

FIG. 1 is a block diagram showing a configuration example of an electric compressor according to the embodiment of the present disclosure. FIG. 2 is a system diagram showing a configuration example of a refrigerant system of a compressor 5 shown in FIG. 1. FIGS. 3 and 4 are schematic diagrams for describing an operation example of the electric compressor 1 shown in FIG. 1. FIG. 5 is a flowchart showing an operation example of a control device 3 shown in FIG. 1. FIG. 6 is a flowchart showing an example (first embodiment) of contents of refrigerant load abnormality determination (S108) shown in FIG. 5.
(Configuration of Electric Compressor)

As shown in FIG. 1, the electric compressor 1 according to the present embodiment includes an inverter 2, a motor 4, and the compressor 5. The electric compressor 1 shown in FIG. 1 can be, for example, an electric compressor mounted on a vehicle such as an electric compressor for a vehicle.

The compressor 5 compresses a refrigerant in a refrigerant system 10 as shown in FIG. 2, for example. The refrigerant system 10 shown in FIG. 2 includes a condenser 11, an expansion valve 12, an evaporator 13, the compressor 5, a refrigerant pipe 14 connecting between the condenser 31 and the expansion valve 12, a refrigerant pipe 15 connecting between the expansion valve 12 and the evaporator 13, a refrigerant pipe 16 connecting between the evaporator 13 and the compressor 5, and a refrigerant pipe 17 connecting between the compressor 5 and the condenser 11. The refrigerant system 10 constitutes, for example, a refrigerant system in an air conditioning system for a vehicle. In the refrigerant system 10, the refrigerant circulates in the order of the compressor 5, the condenser 11, the expansion valve 12, the evaporator 13, and the compressor 5. One end of the refrigerant pipe 16 is connected to a refrigerant intake port of the compressor 5, and one end of the refrigerant pipe 17 is connected to a refrigerant discharge port of the compressor 5. The compressor 5 compresses the refrigerant supplied from the refrigerant pipe 16 and outputs the compressed refrigerant to the refrigerant pipe 17.

As shown in FIG. 1, the compressor 5 is connected to the motor 4 by a drive shaft 6, and is rotationally driven by the motor 4. The motor 4 is, for example, an AC motor such as a three-phase brushless DC motor, and is driven by AC power supplied from the inverter 2. The motor 4 may be of a sensor-less type or may have a position sensor that detects a position of a rotor.

The inverter 2 includes a bridge circuit 20, a capacitor 21, a voltage sensor 22, a current sensor 23, and the control device 3. The bridge circuit 20 is a three-phase bridge circuit including switching portions 24 to 29 including six insulated gate bipolar transistors (IGBTs) and six recirculation diodes each connected between a collector and an emitter of the IGBT. The switching portions 24 to 29 are controlled to be turned on or off at a predetermined timing by the control device 3, and convert a DC voltage supplied from a parallel circuit of a high-voltage battery 7 and the capacitor 21 into a three-phase AC voltage to apply the three-phase AC voltage to a three-phase coil of the motor 4. The voltage sensor 22 detects a DC voltage input to the bridge circuit 20 and outputs a signal indicating a detected voltage value (detection value) to the control device 3. The current sensor 23 detects a DC current input to the bridge circuit 20 and outputs a signal indicating a detected current value (detection value) to the control device 3. The inverter 2 also has other sensors (not shown) that detect a motor current (three-phase current) which is an output current of the inverter 2, a three-phase AC voltage which is an output voltage of the inverter 2, a power element temperature, and the like.

The control device 3 can be configured by using, for example, a computer such as a microcomputer and peripheral circuits of the computer such as a gate drive circuit of the switching portions 24 to 29, an amplifier circuit of an output signal of the current sensor 23, and a power supply circuit. The control device 3 has a control unit 31, a physical quantity calculation unit 32, a rotation speed acquisition unit 33, a storage unit 34, and a refrigerant abnormality determination unit 35, as a functional configuration composed of a combination of hardware such as the computer and the peripheral circuits and software such as a program executed by the computer.

The control unit 31 controls each unit (bridge circuit 20, other functional configurations in the control device 3, and the like) of the inverter 2 that controls the motor 4 that drives the compressor 5. The control unit 31 controls each unit of the inverter 2 in accordance with a request from a host controller 8 such as a vehicle-side controller, and, for example, operates or stops the motor 4, or controls a rotation speed during operation. Further, in a case where a power element temperature/input power/an input current/a motor current or the like exceeds an upper limit or in a case where the input voltage is out of an operable range, the control unit 31 determines that it is difficult to continue the operation and stops the motor 4.

The physical quantity calculation unit 32 calculates a physical quantity Wx that changes according to a workload of the compressor 5 based on one or a plurality of predetermined detection values obtained from the inverter 2 during the operation of the electric compressor 1 (that is, in a state in which the compressor 5 is being driven). In the present embodiment, the physical quantity Wx that changes according to the workload of the compressor 5 is, for example, a value calculated or estimated from one or a plurality of detection values such as an element temperature, an inverter substrate temperature, a current, and a voltage obtained from the inverter 2, and is a quantity that changes according to the workload (load) of the compressor 5. The physical quantity Wx is, for example, the motor current itself, a suction pressure, a discharge pressure, and a load torque that can be estimated from the one or the plurality of detection values, input power of the inverter 2 calculated from the input voltage (DC voltage) and the input current (DC current), output power of the inverter 2 calculated from the motor current and the output voltage (three-phase AC voltage), and the like. In the present embodiment, a state in which the electric compressor 1 is in operation means a state in which the motor 4 is rotationally driving the compressor 5, and a state in which the electric compressor 1 is stopped means a state in which the motor 4 and the compressor 5 are stopped. The physical quantity calculation unit 32 calculates the physical quantity Wx, for example, in step S108 or the like shown in FIG. 5, which will be described later.

The rotation speed acquisition unit 33 acquires the rotation speed of the motor 4. For example, the rotation speed acquisition unit 33 acquires an estimated value of the rotation speed of the motor 4 from the control unit 31, or in a case where the motor 4 includes a position sensor, the rotation speed acquisition unit 33 acquires a calculated value of the rotation speed of the motor 4 based on a detection result of the position sensor. The rotation speed acquisition unit 33 acquires the rotation speed of the motor 4, for example, in step S108 shown or the like shown in FIG. 5, which will be described later.

The storage unit 34 stores first threshold value information 341 and second threshold value information 342. As shown in FIG. 3, the first threshold value information 341 is a threshold value (first threshold value TH1) that changes according to the rotation speed of the motor 4, and is information representing the first threshold value TH1 that defines whether or not the physical quantity Wx is a normal value. In addition, FIG. 3 shows a relationship between the rotation speed, the first threshold value TH1, and the second threshold value TH2 with a horizontal axis representing the rotation speed of the motor 4 and a vertical axis representing the physical quantity Wx that changes according to the workload of the compressor 5. The first threshold value information 341 can be, for example, a table showing a value of the first threshold value TH1 corresponding to the rotation speed, or information representing a calculation formula for calculating the value of the first threshold value TH1 based on the rotation speed.

The second threshold value information 342 is a threshold value (second threshold value TH2) that changes according to the rotation speed of the motor 4, and is information representing the second threshold value TH2 that defines whether the physical quantity Wx is a slight abnormality or a severe abnormality in a case where the physical quantity Wx is not normal. The second threshold value information 342 can be, for example, a table showing a value of the second threshold value TH2 corresponding to the rotation speed, or information representing a calculation formula for calculating the value of the second threshold value TH2 based on the rotation speed. The normality is a region used in normal operation. The slight abnormality is a region that is not used in normal operation but is unlikely to fail even if the operation is continued. The severe abnormality is a region where a failure may occur in a case where the operation is continued.

That is, the slight abnormality is an abnormality such as a state in which, for example, it is presumed that the compressor 5 or the like does not fail even if the compressor 5 or the like is not stopped, and which deviates from a range (normal range) assumed in a normal operating environment such as a decrease in an operation efficiency or the like although the operation can be continuously performed. In this case, in the slight abnormality, the operation can be continued, but it is presumed that some kind of problem may have occurred, for example. In addition, the severe abnormality means, for example, a state in which it is desirable to promptly stop the compressor 5 or the like. In the severe abnormality, it is highly presumed that there is a possibility of occurrence of some problem and it is not desirable to continue the operation. In FIG. 3, widths shown in shading of the first threshold value TH1 and the second threshold value TH2, which increase according to the rotation speed, are widths of hysteresis of the threshold values.

In the electric compressor 1 of the present embodiment, when the refrigerant is compressed, the compressor 5 generates heat due to mechanical loss, but the compressor 5 is prevented from becoming abnormally high temperature, through cooling by the refrigerant. However, when the abnormality occurs in the refrigerant pipes 14 to 17 or the like and the flow of the refrigerant is obstructed, the compressor 5 is not cooled by the refrigerant and generates heat. However, in a case where the electric compressor 1 does not have a sensor for detecting that the flow of the refrigerant is obstructed, the electric compressor 1 cannot directly detect this abnormality. In such a case, if the electric compressor 1 continues to operate in accordance with a request of, for example, the host controller 8 such as a vehicle-side controller, the compressor 5 or the like may eventually fail.

Therefore, as shown in FIG. 4, the electric compressor 1 of the present embodiment determines whether or not there is the abnormality in the refrigerant system based on the physical quantity Wx that changes according to the workload of the compressor 5 by using characteristics that the workload of the compressor 5 decreases when the flow of the refrigerant is obstructed. Then, in a case of the abnormality, the electric compressor 1 stops the operation of the electric compressor 1. FIG. 4 shows changes over time of each characteristic value before and after the state of the refrigerant pipe changes from normal to abnormal (a state in which the flow is obstructed) with a horizontal axis representing time and a vertical axis representing characteristic values relating to the operation of the compressor 5. The characteristic values relating to the operation of the compressor 5 shown in FIG. 4 are, in order from the top, a mechanical temperature (a temperature of a mechanism of the compressor 5), a suction pressure, a discharge pressure, and the physical quantity Wx. In the example shown in FIG. 4, when the mechanical temperature changes from normal to abnormal, the mechanical temperature gradually rises and then becomes saturated at a certain temperature, and the suction pressure, the discharge pressure, and the physical quantity Wx decrease sharply and then maintain low values.

The refrigerant abnormality determination unit 35 compares the physical quantity Wx calculated by the physical quantity calculation unit 32 with the first threshold value TH1 according to the rotation speed acquired by the rotation speed acquisition unit 33 to determine whether or not there is the abnormality in the refrigerant system 10. In addition, the refrigerant abnormality determination unit 35 can compare the calculated physical quantity Wx with the first threshold value TH1 and the second threshold value TH2 according to the acquired rotation speed to determine whether the refrigerant system 10 is in the normality, slight abnormality, or severe abnormality. In addition, the refrigerant abnormality determination unit 35 can determine that the operation can be continued in a case where determination is made to be the normality or the eight abnormality, and can determine that the operation cannot be continued in a case where determination is made to be the severe abnormality.

(Operation of Electric Compressor)

Next, an operation example of the electric compressor 1 shown in FIG. 1 will be described with reference to FIGS. 5 and 6. The process shown in FIG. 5 is repeatedly executed at a constant cycle while the electric compressor 1 is activated. The process shown in FIG. 6 is executed in step S108 of FIG. 5.

When power is supplied to the electric compressor 1 and the control device 3 is activated, the control device 3 starts the process shown in FIG. 5. In the process shown in FIG.

5, first, the control unit 31 determines whether or not there is a suspicion that the inverter 2, the motor 4, or the compressor 5 has failed, based on detection signals of various sensors, execution results of an internal diagnosis process, and the like (step S101). On the other hand, in a case where the control unit 31 determines that there is a suspicion of failure (in a case of "Yes" in step S101), the control device 3 stops the operation (step S112), and ends the process shown in FIG. 5. On the other hand, in a case where it is determined that there is no suspicion of failure (in a case of "No" in step S101), the control unit 31 confirms various detection values such as a current, a voltage, power, and a temperature (step S102). Next, the control unit 31 determines whether or not the various detection values are within an operable range of the electric compressor 1 (step S103). In a case where the operation is possible (in a case of "Yes" in step S103), the control unit 31 determines whether or not there is an operation request from the host controller 8 (step S104).

In a case where there is the operation request (in a case of "Yes" in step S104), the control unit 31 determines whether or not the electric compressor is stopped due to refrigerant load abnormality determination (step S105). Here, the term "stopped based on the refrigerant load abnormality determination" means a state in which it is determined not possible to continue the operation of the electric compressor 1 in the refrigerant load abnormality determination (step S108) and the electric compressor 1 is stopped (a state of "No" in step S110)—the electric compressor 1 is stopped in step 111).

On the other hand, in a case where the electric compressor 1 is not stopped due to the refrigerant load abnormality determination (in a case of "No" in step S105), the control unit 31 determines whether or not the electric compressor 1 is in operation (step S106). In a case where the electric compressor 1 is not in operation (in a case of "No" in step S106), the control unit 31 starts the operation of the electric compressor 1 (step S107) and executes the refrigerant load abnormality determination (step S108). On the other hand, when the electric compressor 1 is in operation (in a case of "Yes" in step S106), the control unit 31 executes the refrigerant load abnormality determination (step S108).

In addition, in a case where the electric compressor 1 is stopped due to the refrigerant load abnormality determination (in a case of "Yes" in step S105), the control unit 31 determines whether or not the stop due to the refrigerant load abnormality determination continues for a predetermined time (step S109). In a case where the stop continues for the predetermined time (in a case of "Yes" in step S109), the control unit 31 starts the operation of the electric compressor 1 (step S107) and executes the refrigerant load abnormality determination (step S108).

In the refrigerant load abnormality determination of step S108, the refrigerant abnormality determination unit compares the physical quantity Wx that changes according to the workload of the compressor 5 calculated by the physical quantity calculation unit 32 with the first threshold value TH and the second threshold value TH2 described with reference to FIG. 3 based on the rotation speed acquired by the rotation speed acquisition unit 33 to determine whether or not the electric compressor 1 can continue operation. In the present embodiment, the refrigerant abnormality determination unit 35 compares the physical quantity Wx with the first threshold value TH and the second threshold value TH2 in a state in which the electric compressor 1 is in operation, and determines whether or not the electric compressor 1 can continue operation. Therefore, in a case where the electric compressor is not in operation (in a case of "No" in step S106), the control unit 31 executes the refrigerant load abnormality determination (step S108) after starting the operation of the electric compressor 1 (step S107).

Further, in the present embodiment, in a case where the refrigerant abnormality determination unit 35 determines that the operation cannot be continued in the refrigerant load abnormality determination of step S108 and the control unit 31 stops the electric compressor 1 (in a case of "No" in step S110—the electric compressor 1 is stopped in step 111), the control device 3 executes again the refrigerant load abnormality determination (step S108) when the stopped state continues for a predetermined time (when "Yes" in step S109). Through these processes, in a case where it is determined that the operation cannot be continued in the refrigerant load abnormality determination of step S108, the control device 3 executes again the refrigerant load abnormality determination of step S108 after the continuation for a predetermined time, and in a case where the flow of the refrigerant is recovered or the previous determination is erroneous, the electric compressor 1 can be operated. In addition, for example, a limit may be set on the number of times the refrigerant load abnormality determination is made again after the continuation for a predetermined time, or the predetermined time may be changed according to the number of repetitions.

After the refrigerant abnormality determination unit 35 executes the refrigerant load abnormality determination in step 108, the control unit 31 determines whether or not it is determined by the refrigerant abnormality determination unit 35 that the operation can be continued (step S110). On the other hand, in a case where it is determined that the operation can be continued (in a case of "Yes" in step 110), the control unit 31 executes a determination process of step S101 again, and on the other hand, in a case where it is determined that the operation cannot be continued (in a case of "No" in step S110), the control unit 31 stops the electric compressor 1 (step S111) and executes the determination process of step S101 again.

In addition, in a case where the operation is not possible (in a case of "No" in step S103), in a case where there is no operation request (in a case of "No" in step S104), or in a case where the stopped state is not continued for a predetermined time (in a case of "No" in step S109), the control unit 31 stops the electric compressor 1 (step S111), and executes the determination process of step S101 again.

In addition, in the refrigerant load abnormality determination of step S108, as shown in FIG. 6, the refrigerant abnormality determination unit 35 first determines whether or not the refrigerant load abnormality determination is possible (step S201). In step S201, the refrigerant abnormality determination unit 35 determines that the determination is not possible, for example, in a case where the rotation speed of the motor 4 is not stable at the time of activating the motor 4 ("No" in step S201), tentatively determines that the operation can be continued (step S204), for example, in order to continue the operation until the rotation speed becomes stable, and ends the refrigerant load abnormality determination process shown in FIG. 6. On the other hand, in a case where it is determined that the refrigerant load abnormality determination is possible (in a case of "Yes" in step S201), the refrigerant abnormality determination unit 35 compares the calculated physical quantity Wx with the first threshold value TH1 and the second threshold value TH2 according to the acquired rotation speed to determine whether or not there is the abnormality in the refrigerant system (step S202).

Next, the refrigerant abnormality determination unit 35 determines whether or not the determination result in step S202 is the severe abnormality (step 203). On the other hand, in a case where the severe abnormality occurs (in a case of "Yes" in step S203), the refrigerant abnormality determination unit 35 determines that the operation cannot be continued (step S205) and ends the refrigerant load abnormality determination process shown in FIG. 6. On the other hand, in a case where there is no severe abnormality (in a case of "No" in step S203), the refrigerant abnormality determination unit 35 determines that the operation can be continued (step S204) and ends the refrigerant load abnormality determination process shown in FIG. 6.

(Operations and Effects)

According to the electric compressor 1 or the control device 3 according to the present embodiment, it is possible to determine whether or not there is the abnormality in the refrigerant such as the obstruction of the flow of the refrigerant compressed by the compressor 5, for example, by comparing the physical quantity Wx that changes according to the workload (load) of the compressor 5, which is a value calculated or estimated from one or a plurality of detection values such as a current, a voltage, and an element temperature obtained from the inverter 2, with the threshold values (first threshold value TH1 and the second threshold value TH2) that change according to the rotation speed of the motor 4. Since these detection values can be easily acquired, the configuration of the electric compressor 1 can be easily simplified.

Second Embodiment

Figure 7:
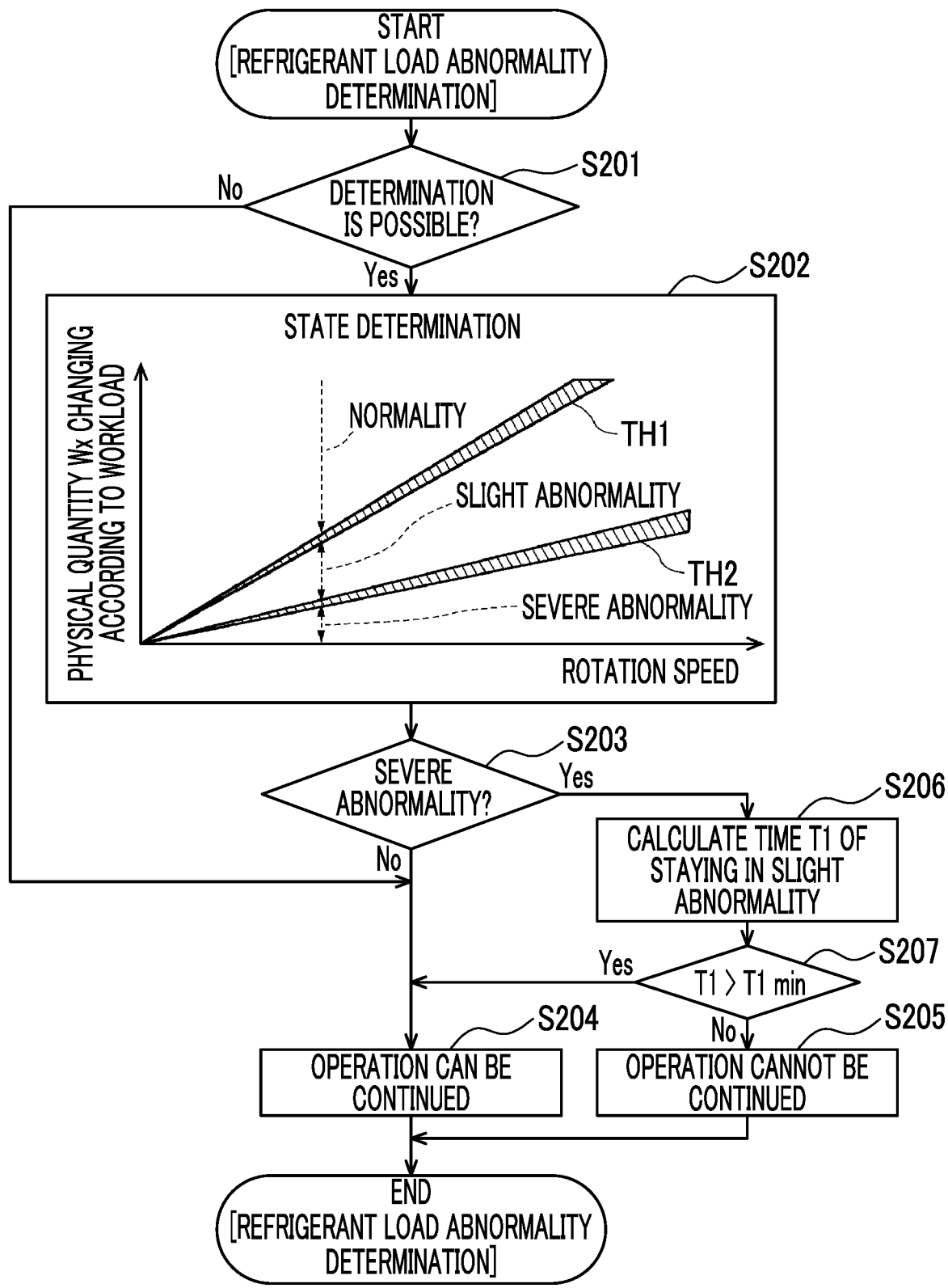
FIG. 7 is a flowchart showing an example (second embodiment) of the contents of the refrigerant load abnormality determination (S108) shown in FIG. 5.
Figure 8:
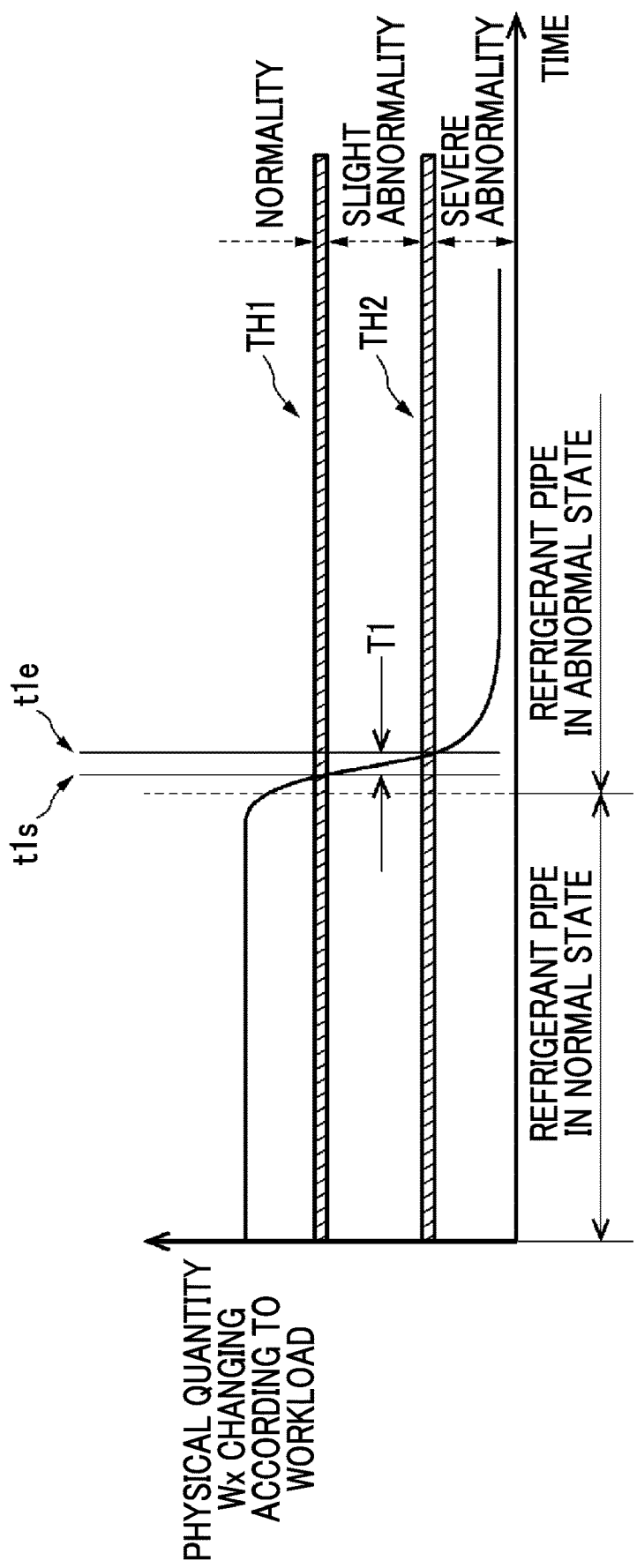
FIG. 8 is a schematic diagram for describing an operation example of the control device 3 shown in FIG. 7.

Hereinafter, an electric compressor according to a second embodiment of the present disclosure will be described with reference to FIGS. 7 and 8. The configuration and operation of the electric compressor according to the second embodiment are the same as the configuration and operation of the electric compressor according to the first embodiment with respect to portions described with reference to FIGS. 1 to 5. The contents of the refrigerant load abnormality determination process according to the first embodiment described with reference to FIG. 6 are different from the contents of the refrigerant load abnormality determination process according to the second embodiment shown in FIG. 7. FIG. 7 is a flowchart showing an example (second embodiment) of the contents of the refrigerant load abnormality determination (S108) shown in FIG. 5. FIG. 8 is a schematic diagram for describing an operation example of the control device 3 shown in FIG. 7 and shows changes over time of the physical quantity Wx in a case where the rotation speed is constant with a horizontal axis representing time and a vertical axis representing the physical quantity Wz that changes according to the workload.

(Operation of Electric Compressor)

In the refrigerant load abnormality determination process (S108 in FIG. 5) of the second embodiment shown in FIG. 7, a process of step S206 and a process of step S207 are newly added to the refrigerant load abnormality determination process (S108 of FIG. 5) of the first embodiment shown in FIG. 6.

Hereinafter, in the second embodiment, the process different from that of the first embodiment will be described. In the refrigerant load abnormality determination process shown in FIG. 7, in a case where the determination is made to be the severe abnormality (in a case of "Yes" in step S203), the refrigerant abnormality determination unit 35 calculates time T1 of staying in the slight abnormality (step S206). Next, the refrigerant abnormality determination unit 35 determines whether or not the time T1 is larger than a reference value T1min of a staying time set as the shortest value (step S207). Meanwhile, in a case where the time T1 is larger than the reference value T1min (in a case of "Yes" in step S207), the refrigerant abnormality determination unit 35 determines that the operation can be continued (step S204) and ends the refrigerant load abnormality determination process shown in FIG. 7. On the other hand, in a case where the time T1 is not larger than the reference value T1min (in a case of "No" in step S207), the refrigerant abnormality determination unit 35 determines that the operation cannot be continued (step S205) and ends the refrigerant load abnormality determination process shown in FIG. 7. In the second embodiment, in a case where the determination is made to be the severe abnormality, it is determined that the operation cannot be continued when the time T1 of staying in the slight abnormality is equal to or smaller than the reference value T1min, and it is determined that the operation can be continued when the time T1 of staying in the slight abnormality is larger than the reference value T1min.

As shown in FIG. 8, for example, the time T1 staying in the slight abnormality is the time from a point in time t1s first determined to be the slight abnormality to a point in time t1e last determined to be the slight abnormality before the determination is made to be the severe abnormality. In a case where the time T1 is short, it can be determined that the change in the physical quantity Wx is abrupt. In a case where the determination result in step S202 is the severe abnormality from the beginning, the time T1 can be set to zero.

Also in the electric compressor 1 of the second embodiment, similarly to the electric compressor 1 of the first embodiment, the refrigerant load abnormality determination is performed in a state in which the electric compressor 1 is being operated, and in a case where it is determined that the operation cannot be continued, the compressor is stopped. Further, also in the electric compressor 1 of the second embodiment, similarly to the electric compressor 1 of the first embodiment, in the refrigerant load abnormality determination, the physical quantity Wx that changes according to the workload is discriminated as the normality, slight abnormality, or severe abnormality, and in a case of corresponding to the normality or slight abnormality, it is determined that the operation can be continued because there is no possibility of failure even if the operation is continued.

On the other hand, in the electric compressor 1 of the second embodiment, unlike the electric compressor 1 of the first embodiment, in a case where it is determined that the physical quantity Wx that changes according to the current workload corresponds to the severe abnormality, and the physical quantity Wx that changes according to the workload has changed abruptly from the normality to the severe abnormality, it is determined that the operation cannot be continued due to the refrigerant abnormality.

In the electric compressor 1 of the second embodiment, an index of abruptness of the change is determined by the time T1 at which the physical quantity Wx changing according to the workload is determined to be a value corresponding to the slight abnormality, and in a case where the time T1 is shorter than the reference value T1min, it is determined that the change is abrupt.

(Operations and Effects)

According to the second embodiment, it is determined that the operation cannot be continued when the flow of the refrigerant is obstructed, and it is possible to prevent the mechanism from being damaged by abnormal heating.

Third Embodiment

Figure 9:
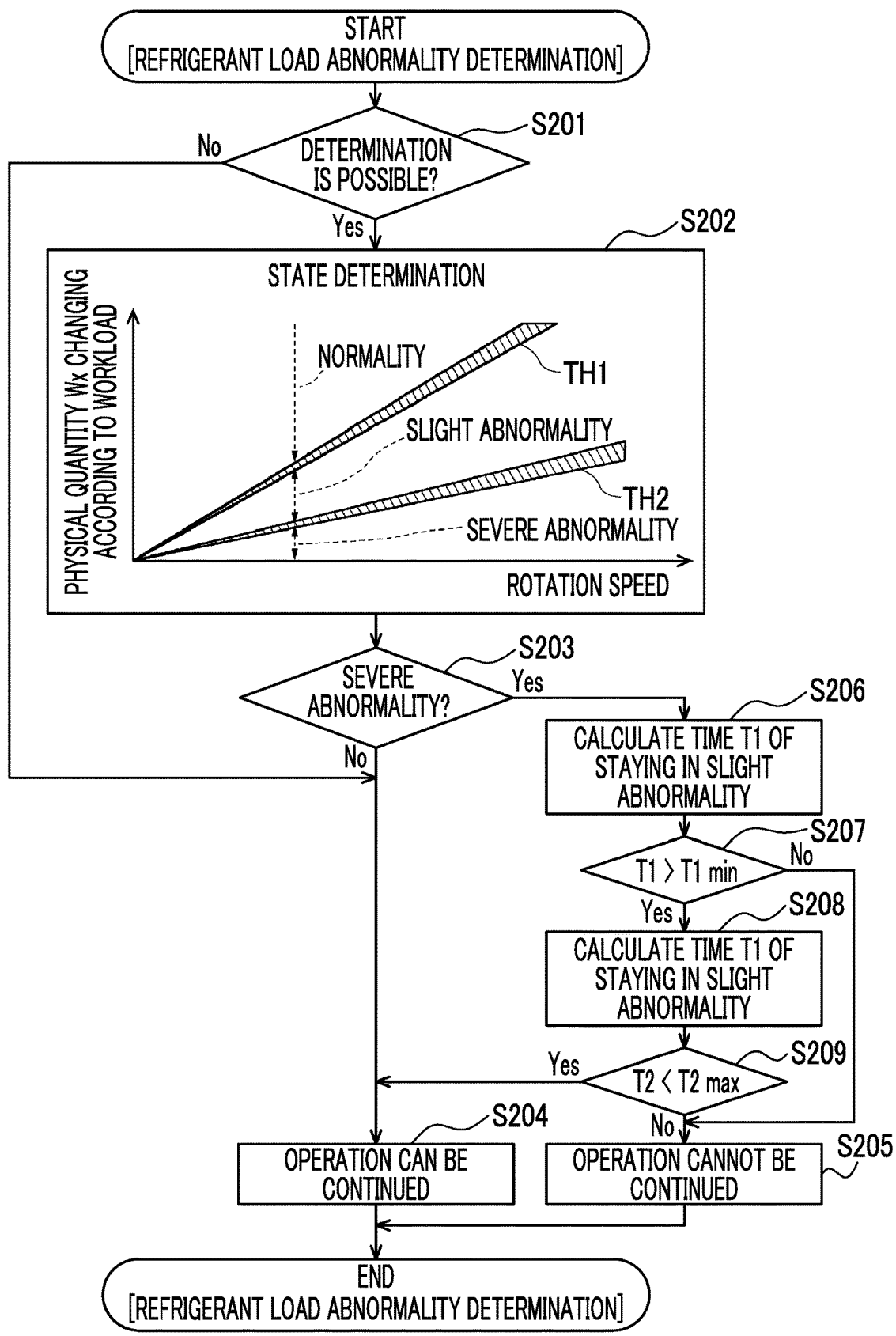
FIG. 9 is a flowchart showing an example (third embodiment) of the contents of the refrigerant load abnormality determination (S108) shown in FIG. 5.
Figure 10:
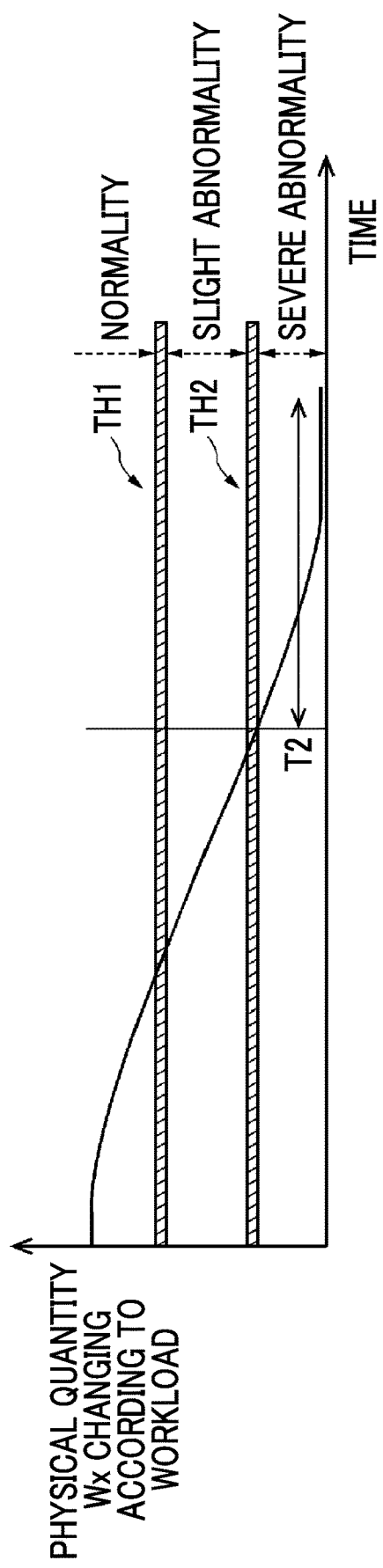
FIG. 10 is a schematic diagram for describing an operation example of the control device 3 shown in FIG. 7.

Hereinafter, an electric compressor according to a third embodiment of the present disclosure will be described with reference to FIGS. 9 and 10. The configuration and operation of the electric compressor according to the third embodiment are the same as the configuration and operation of the electric compressor according to the first and second embodiments with respect to portions described with reference to FIGS. 1 to 5. The contents of the refrigerant load abnormality determination process according to the first and second embodiments described with reference to FIGS. 6 and 7 are different from the contents of the refrigerant load abnormality determination process according to the third embodiment shown in FIG. 9. FIG. 9 is a flowchart showing an example (third embodiment) of the contents of the refrigerant load abnormality determination (S108) shown in FIG. 5. FIG. 10 is a schematic diagram for describing an operation example of the control device 3 shown in FIG. 9 and shows changes over time of the physical quantity Wx in a case where the rotation speed is constant with a horizontal axis representing time and a vertical axis representing the physical quantity Wx that changes according to the workload.

(Operation of Electric Compressor)

In the refrigerant load abnormality determination process (S108 in FIG. 5) of the third embodiment shown in FIG. 9, a process of step S208 and a process of step S209 are newly added to the refrigerant load abnormality determination process (S108 of FIG. 5) of the second embodiment shown in FIG. 7. Hereinafter, in the third embodiment, the process different from that of the second embodiment will be described.

In the refrigerant load abnormality determination process shown in FIG. 9, in a case where the time T3 is larger than the reference value T1min (in a case of "Yes" in step S2017), the refrigerant abnormality determination unit 35 calculates time T2 of staying in the severe abnormality (step S208) and determines whether or not the time T2 is smaller than a reference value T2max of the longest staying time (step S209). Meanwhile, in a case where the time T2 is smaller than the reference value T2max of the longest staying time (in a case of "Yes" in step S209), the refrigerant abnormality determination unit 35 determines that the operation can be continued (step S204) and ends the refrigerant load abnormality determination process shown in FIG. 9. On the other hand, in a case where the time T2 is equal to or larger than the reference value T2max of the longest staying time (in a case of "No" in step S209), the refrigerant abnormality determination unit 35 determines that the operation cannot be continued (step S205) and ends the refrigerant load abnormality determination process shown in FIG. 9.

In addition, the time T2 of staying in the severe abnormality is, for example, the time of staying in the severe abnormality continuously after being determined to be the severe abnormality, as shown in FIG. 10.

In the second embodiment, it is determined that the operation cannot be continued only in a case where the time T1 of staying in the slight abnormality is equal to or smaller than the reference value T1min. In this case, depending on a state in which the flow of the refrigerant is obstructed, it is also conceivable that a decrease in the physical quantity Wx that changes according to the workload may be gentler than expected, and the time T1 of staying in the slight abnormality may not be equal to or less than the reference value T1min. Even in such a case, since it is not possible to continue the operation of the electric compressor 1 for a long time, it is necessary to determine that the operation cannot be continued. Therefore, in the third embodiment, in addition to the second embodiment, even in a case where the physical quantity Wx that changes according to the workload is a value of the severe abnormality and the change thereof is not abrupt, the determination is made by the time T2 at which it is determined that the physical quantity Wx that changes according to the workload is a value corresponding to the severe abnormality, and in a case where the time T2 is longer than the reference value T2max, it is determined that the operation cannot be continued. In a case where the reference value T2max is set in order to mount the electric compressor 1 incorporating the present protection control on an actual vehicle, it is desirable that the reference value T2max is changed with respect to the rotation speed, and a shorter time is set at a high rotation speed than at a low rotation speed.

(Operations and Effects)

According to the third embodiment, it can be determined that the operation of the electric compressor cannot be continued even in a case where the change of the physical quantity Wx, which changes according to the workload when the flow of the refrigerant is obstructed, is gentle.

Modification Example of Each Embodiment

In the first embodiment, the second embodiment, and the third embodiment, the threshold values (first threshold value TH1 and second threshold value TH2) for discriminating the physical quantity Wx, which changes according to the workload, as the normality, slight abnormality, or severe abnormality are changed depending on the rotation speed. In addition, for example, a range corresponding to the normality is defined as a region used in normal operation, but this region changes depending on an ambient temperature of the electric compressor 1. Therefore, in order to more accurately discriminate the normality, slight abnormality, and severe abnormality, corrections based on the ambient temperature may be added to these threshold values (first threshold value TH1 and second threshold value TH2). It is conceivable to acquire the ambient temperature by means of, for example, receiving from the host controller 8, adding a sensor to the electric compressor 1, or estimating from a sensor in the electric compressor 1.

In addition, the electric compressor 1 can be used not only in cooling but also in a heating heat pump. However, a relationship between the rotation speed and the pressure during operation differs between cooling and heating. Therefore, it is desirable that a plurality of determination criteria for the normality, slight abnormality, and severe abnormality which are determined by the physical quantity Wx that changes according to the workload and the rotation speed as shown in FIG. 3 are provided in advance so as to be switched between cooling and heating.

In addition, in a low-speed operation, a failure may not occur even if the severe abnormality continues. Therefore, a lower limit of the rotation speed for performing the refrigerant load abnormality determination may be set.

According to the above modification example, for example, the normality, slight abnormality, and severe abnormality can be discriminated more accurately.

OTHER EMBODIMENTS

Above, the embodiments of the present disclosure have been described in detail with reference to the drawings.

However, the specific configuration is not limited to the embodiments, and includes design changes and the like within a scope not departing from the gist of the present disclosure. For example, the first threshold value TH1 and the second threshold value TH2 may have values that change in a stepwise manner, for example.

<Computer Configuration>

Figure 11:
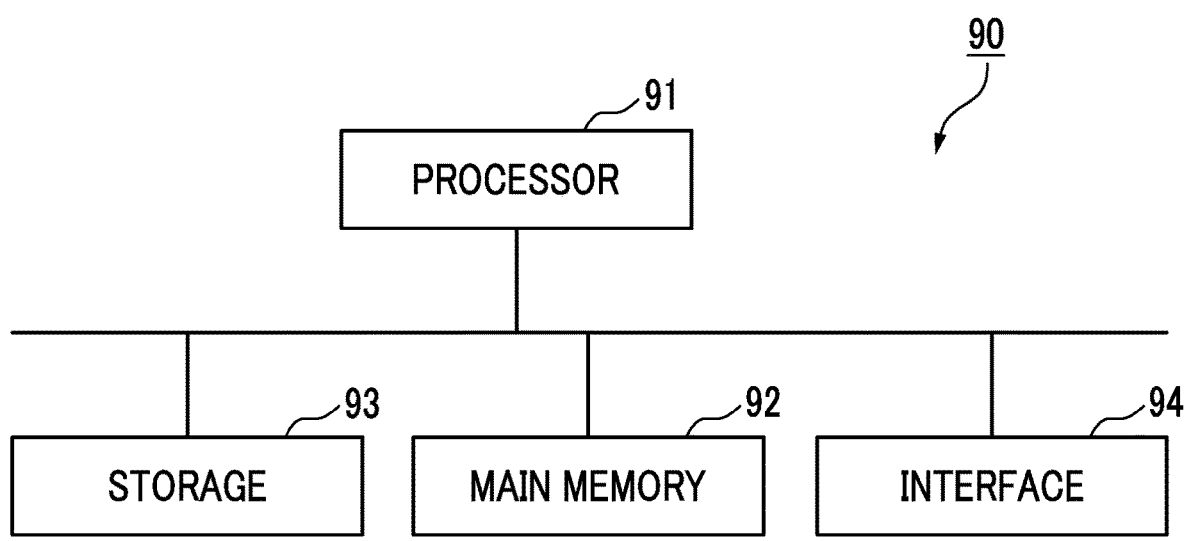
FIG. 11 is a schematic block diagram showing a configuration of a computer according to at least one embodiment.

FIG. 11 is a schematic block diagram showing a configuration of a computer according to at least one embodiment.

A computer 90 includes a processor 91, a main memory 92, a storage 93, and an interface 94.

The control device 3 described above is mounted on the computer 90. Then, the operation of each processing unit described above is stored in the storage 93 in the form of a program. The processor 91 reads out the program from the storage 93, loads the program into the main memory 92, and executes the above process according to the program. The processor 91 ensures a storage area corresponding to each storage unit described above in the main memory 92 according to the program.

The program may be a program for realizing a part of the functions that are exhibited by the computer 90. For example, the program may exhibit the functions in combination with other programs already stored in the storage or in combination with other programs installed on other devices. In another embodiment, the computer may include a custom large scale integrated circuit (LSI) such as a programmable logic device (PLD) in addition to or instead of the above configuration. Examples of the PLD include a programmable array logic (PAL), a generic array logic (GAL), a complex programmable logic device (CPLD), and a field programmable gate array (FPGA). In this case, a part or all of the functions realized by the processor may be realized by the integrated circuit.

Examples of the storage 93 include a hard disk drive (HDD), a solid state drive (SSD), a magnetic disk, an optical magnetic disk, a compact disc read only memory (CD-ROM), a digital versatile disc read only memory (DVD-ROM), and a semiconductor memory. The storage 93 may be an internal medium directly connected to a bus in the computer 90 or may be an external medium connected to the computer 90 via an interface 94 or a communication line. In a case where the program is distributed to the computer 90 via the communication line, the computer 90 that receives the distribution may load the program into the main memory 92 and execute the above process. In at least one embodiment, the storage 93 is a non-transitory tangible storage medium.

<Additional Notes>

The control device 3 described in each embodiment is understood as follows, for example.

(1) An electric compressor control device (control device 3) according to a first aspect includes: the control unit 31 of the inverter 2 that controls the motor 4 that drives the compressor 5; the physical quantity calculation unit 32 that calculates the physical quantity Wx that changes according to a workload of the compressor 5 based on one or a plurality of predetermined detection values (a detection value of the voltage sensor 22, a detection value of the current sensor 23, and the like) obtained from the inverter 2; the rotation speed acquisition unit 33 that acquires a rotation speed of the motor 4; the storage unit 34 that stores information (first threshold value information 341) representing the first threshold value TH1 that changes according to the rotation speed of the motor 4 and defines whether or not the physical quantity Wx is a normal value; and the refrigerant abnormality determination unit 35 that determines whether or not there is an abnormality in the refrigerant system 10 by comparing the calculated physical quantity Wx with the first threshold value TH1 according to the acquired rotation speed.

According to the electric compressor control device (control device 3) according to the first aspect, since a state of the refrigerant system 10 can be estimated without using a detection value of a temperature in the refrigerant system 10, the configuration can be easily simplified.

(2) An electric compressor control device (control device 3) according to a second aspect is the electric compressor control device (control device 3) of (1), in which the storage unit 34 further stores information (second threshold value information 342) representing the second threshold value TH2 that changes according to the rotation speed of the motor 4 and defines whether the physical quantity Wx is the slight abnormality or the severe abnormality in a case where the physical quantity Wx is not normal, and the refrigerant abnormality determination unit 35 determines whether the refrigerant system 10 is in the normality, slight abnormality, or severe abnormality by comparing the calculated physical quantity Wx with the first threshold value TH1 and the second threshold value TH2 according to the acquired rotation speed.

According to the electric compressor control device (control device 3) according to the second aspect, the abnormal state can be discriminated into the slight abnormality and the severe abnormality.

(3) An electric compressor control device (control device 3) according to a third aspect is the electric compressor control device (control device 3) of (2), in which the refrigerant abnormality determination unit 35 determines that operation can be continued (S204) in a case where determination is made to be the normality or slight abnormality and determines that the operation cannot be continued (S205) in a case where determination is made to be the severe abnormality.

According to the electric compressor control device (control device 3) according to the third aspect, the operation can be continued in a case of the slight abnormality.

(4) An electric compressor control device (control device 3) according to a fourth aspect is the electric compressor control device (control device 3) of (2), in which in a case where determination is made to be the severe abnormality, the refrigerant abnormality determination unit 35 determines that operation cannot be continued (3205) when a time T1 from the determination to be the slight abnormality to the determination to be the severe abnormality is shorter than a first time (T1min).

According to the electric compressor control device (control device 3) according to the fourth aspect, it can be determined that the operation cannot be continued (S205) in a case where the change in the physical quantity Wx is abrupt.

(5) An electric compressor control device (control device 3) according to a fifth aspect is the electric compressor control device (control device 3) of (4), in which in a case where determination 13 made to be the severe abnormality, the refrigerant abnormality determination unit 35 determines that the operation cannot be continued (S205) when the time T1 from the determination to be the slight abnormality to the determination to be the severe abnormality is shorter than the first time (T1min), and determines that the operation cannot be continued (S205) when a time T2 from the determination to be the severe abnormality is longer than a second time (T2max).

According to the electric compressor control device (control device 3) according to the fifth aspect, even in a case where the change in the physical quantity Wx is not abrupt, it can be determined that the operation cannot be continued (S205) when the severe abnormality is long.

(6) An electric compressor control device (control device 3) according to a sixth aspect is the electric compressor control device (control device 3) of (5), in which the second time (T2max) is determined to be short in a case where the rotation speed of the motor 4 is high and to be long in a case where the rotation speed of the motor 4 is low.

According to the electric compressor control device (control device 3) according to the sixth aspect, a time until it is determined that the operation cannot be continued can be set according to a possibility that a problem occurs in the electric compressor 1.

(7) An electric compressor control device (control device 3) according to a seventh aspect is the electric compressor control device (control device 3) of (1) to (6), in which the physical quantity is input power or output power of the inverter 2.

(8) An electric compressor control method according to an eighth aspect is a control method of the inverter 2 that controls the motor 4 that drives the compressor 5, and includes: a step (S108, etc.) of calculating the physical quantity Wx that changes according to the workload of the compressor 5 based on one or a plurality of predetermined detection values obtained from the inverter 2; a step (S108, etc.) of acquiring the rotation speed of the motor 4; and a step (S202) of determining whether or not there is an abnormality in the refrigerant system by comparing the calculated physical quantity Wx with the first threshold value TH1 that changes according to the rotation speed of the motor 4 and defines whether or not the physical quantity Wx is a normal value according to the acquired rotation speed.

(9) In an electric compressor control method according to a ninth aspect, the physical quantity is input power or output power of the inverter.

INDUSTRIAL APPLICABILITY

According to the electric compressor control device, the electric compressor, and the electric compressor control method of the present disclosure, the configuration can be simplified.

REFERENCE SIGNS LIST

1: Electric compressor
2: Inverter
3: Control device
4: Motor
5: Compressor
31: Control unit
32: Physical quantity calculation unit
33: Rotation speed acquisition unit
34: Storage unit
35: Refrigerant abnormality determination unit

The invention claimed is:
1. An electric compressor control device comprising:
a control unit of an inverter that controls a motor that drives a compressor;
a physical quantity calculation unit that calculates a physical quantity that changes according to a workload of the compressor based on one or a plurality of predetermined detection values obtained from the inverter;
a rotation speed acquisition unit that acquires a rotation speed of the motor;
a storage unit that stores:
information representing a first threshold value that changes according to the rotation speed of the motor and defines whether or not the physical quantity is a normal value; and
information representing a second threshold value that changes according to the rotation speed of the motor and defines whether the physical quantity is a slight abnormality or severe abnormality in a case where the physical quantity is not normal; and
a refrigerant abnormality determination unit that determines whether or not there is an abnormality in a refrigerant system by comparing the calculated physical quantity with the first threshold value according to the acquired rotation speed, wherein
the refrigerant abnormality determination unit determines whether the refrigerant system is in a normality, slight abnormality, or severe abnormality by comparing the calculated physical quantity with the first threshold value and the second threshold value according to the acquired rotation speed, and
in a case where determination is made to be the severe abnormality, the refrigerant abnormality determination unit determines that operation is not continuable when a time from the determination to be the slight abnormality to the determination to be the severe abnormality is shorter than a first time.

2. The electric compressor control device according to claim 1 wherein the refrigerant abnormality determination unit determines that operation is continuable in a case where determination is made to be the normality or slight abnormality and determines that the operation is not continuable in a case where determination is made to be the severe abnormality.

3. The electric compressor control device according to claim 1, wherein in a case where determination is made to be the severe abnormality, the refrigerant abnormality determination unit determines that the operation is not continuable when the time from the determination to be the slight abnormality to the determination to be the severe abnormality is shorter than the first time, and determines that the operation is not continuable when a time from the determination to be the severe abnormality is longer than a second time.

4. The electric compressor control device according to claim 3, wherein the second time is determined to be short in a case where the rotation speed of the motor is high and to be long in a case where the rotation speed of the motor is low.

5. The electric compressor control device according to claim 1, wherein the physical quantity is input power or output power of the inverter.

6. An electric compressor comprising:
a compressor;
a motor that drives the compressor;
a control unit of an inverter that controls the motor;
a physical quantity calculation unit that calculates a physical quantity that changes according to a workload of the compressor based on one or a plurality of predetermined detection values obtained from the inverter;

a rotation speed acquisition unit that acquires a rotation speed of the motor;

a storage unit that stores:
information representing a first threshold value that changes according to the rotation speed of the motor and defines whether or not the physical quantity is a normal value; and information representing a second threshold value that changes according to the rotation speed of the motor and defines whether the physical quantity is a slight abnormality or severe abnormality in a case where the physical quantity is not normal; and a refrigerant abnormality determination unit that determines whether or not there is an abnormality in a refrigerant system by comparing the calculated physical quantity with the first threshold value according to the acquired rotation speed, wherein the refrigerant abnormality determination unit determines whether the refrigerant system is in a normality, slight abnormality, or severe abnormality by comparing the calculated physical quantity with the first threshold value and the second threshold value according to the acquired rotation speed, and in a case where determination is made to be the severe abnormality, the refrigerant abnormality determination unit determines that operation is not continuable when a time from the determination to be the slight abnormality to the determination to be the severe abnormality is shorter than a first time.

7. The electric compressor according to claim 6, wherein the physical quantity is input power or output power of the inverter.

8. An electric compressor control method which is a control method of an inverter that controls a motor that drives a compressor, the method comprising:

a step of calculating a physical quantity that changes according to a workload of the compressor based on one or a plurality of predetermined detection values obtained from the inverter;

a step of acquiring a rotation speed of the motor;

a step of determining whether or not there is an abnormality in a refrigerant system by comparing the calculated physical quantity with a first threshold value that changes according to the rotation speed of the motor and defines whether or not the physical quantity is a normal value according to the acquired rotation speed; and a step of determining whether the refrigerant system is in a normality, slight abnormality, or severe abnormality by comparing the calculated physical quantity with the first threshold value and a second threshold value according to the acquired rotation speed, wherein the second threshold value changes according to the rotation speed of the motor and defines whether the physical quantity is a slight abnormality or severe abnormality in a case where the physical quantity is not normal, wherein in a case where determination is made to be the severe abnormality, the method further comprises determining that operation is not continuable when a time from the determination to be the slight abnormality to the determination to be the severe abnormality is shorter than a first time.

9. The electric compressor control method according to claim 8, wherein the physical quantity is input power or output power of the inverter.

* * * * *